(12) United States Patent
Tsujimoto

(10) Patent No.: US 8,902,439 B2
(45) Date of Patent: *Dec. 2, 2014

(54) MULTIFUNCTION PERIPHERAL

(75) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 2 days.

This patent is subject to a terminal disclaimer.

(21) Appl. No.: 13/251,372

(22) Filed: Oct. 3, 2011

(65) Prior Publication Data

US 2012/0086969 A1 Apr. 12, 2012

(30) Foreign Application Priority Data

Oct. 8, 2010 (JP) ................................ 2010-228774

(51) Int. Cl.
*G06F 3/12* (2006.01)
*H04N 1/00* (2006.01)

(52) U.S. Cl.
CPC ....... *H04N 1/00464* (2013.01); *H04N 1/00973* (2013.01); *H04N 1/00477* (2013.01); *H04N 2201/0039* (2013.01); *H04N 2201/0094* (2013.01); *H04N 1/00244* (2013.01); *H04N 1/00408* (2013.01)
USPC ....................................... 358/1.13

(58) Field of Classification Search
USPC ......... 358/1.18, 1.9, 1.13, 1.8, 1.15; 707/7.81
See application file for complete search history.

(56) References Cited

U.S. PATENT DOCUMENTS

| | | | |
|---|---|---|---|
| 5,422,993 A | 6/1995 | Fleming | |
| 5,590,045 A | 12/1996 | Kaak et al. | |
| 5,950,045 A | 9/1999 | Nomura et al. | |
| 6,421,509 B1 | 7/2002 | Nomura et al. | |
| 7,096,265 B2 | 8/2006 | Simpson et al. | |
| 7,859,694 B2 * | 12/2010 | Inada ........................... | 358/1.15 |
| 8,176,075 B2 * | 5/2012 | Kuroyanagi .................. | 707/781 |
| 8,325,354 B2 | 12/2012 | Yoshida et al. | |
| 2002/0004802 A1 | 1/2002 | Shima | |
| 2002/0147661 A1 | 10/2002 | Hatakama et al. | |
| 2002/0171681 A1 | 11/2002 | Nomura et al. | |

(Continued)

FOREIGN PATENT DOCUMENTS

| | | |
|---|---|---|
| CN | 101056346 A | 10/2007 |
| CN | 101087341 A | 12/2007 |

(Continued)

OTHER PUBLICATIONS

Related U.S. Appl. No. 13/234,469, filed Sep. 16, 2011 (application provided).

(Continued)

*Primary Examiner* — Mark Zimmerman
*Assistant Examiner* — Marchelle L Taggart
(74) *Attorney, Agent, or Firm* — Renner, Otto, Boisselle & Sklar, LLP

(57) ABSTRACT

A multifunction peripheral includes: a second storage section which stores state image data for causing a display section to display an image indicative of a state of the multifunction peripheral; and a device control section which generates a URL indicative of a location of the state image data. A web browser section obtains the state image data indicated by the URL from the second storage section in accordance with operation screen data including the URL generated by the device control section, so as to cause an operation screen including a state image represented by the state image data to be displayed in the display section.

7 Claims, 8 Drawing Sheets

(56) References Cited

U.S. PATENT DOCUMENTS

| | | |
|---|---|---|
| 2004/0246762 A1 | 12/2004 | Inada |
| 2005/0046887 A1 | 3/2005 | Shibata et al. |
| 2006/0143185 A1 | 6/2006 | Kuroyanagi |
| 2007/0159663 A1 | 7/2007 | Tsujimoto |
| 2007/0165265 A1 | 7/2007 | Ito et al. |
| 2007/0182986 A1 | 8/2007 | Ciriza et al. |
| 2007/0268517 A1 | 11/2007 | Koarai |
| 2008/0123127 A1 | 5/2008 | Okamoto et al. |
| 2008/0150952 A1 | 6/2008 | Koarai |
| 2010/0073701 A1 | 3/2010 | Okada et al. |
| 2011/0102827 A1 | 5/2011 | Nishino et al. |

FOREIGN PATENT DOCUMENTS

| | | |
|---|---|---|
| JP | 04-296965 A | 10/1992 |
| JP | 10-326288 A | 12/1998 |
| JP | 11-231729 | 8/1999 |
| JP | 2000-092257 A | 3/2000 |
| JP | 2001-127986 A | 5/2001 |
| JP | 2001-154773 A | 6/2001 |
| JP | 2002-300338 A | 10/2002 |
| JP | 2002-344682 A | 11/2002 |
| JP | 2003-032413 A | 1/2003 |
| JP | 2003-150484 A | 5/2003 |
| JP | 2003-308195 | 10/2003 |
| JP | 2005-045370 A | 2/2005 |
| JP | 2005-080018 A | 3/2005 |
| JP | 2005-102044 A | 4/2005 |
| JP | 2005-346739 A | 12/2005 |
| JP | 2006-203870 A | 8/2006 |
| JP | 2006-237705 A | 9/2006 |
| JP | 2007-174400 A | 7/2007 |
| JP | 2008-003833 A | 1/2008 |
| JP | 2008-131388 A | 6/2008 |
| JP | 2008-139981 A | 6/2008 |
| JP | 2008-199151 A | 8/2008 |
| JP | 2008-287531 A | 11/2008 |
| JP | 2009-208430 A | 9/2009 |
| JP | 2010-74573 A | 4/2010 |
| JP | 2011-096098 A | 5/2011 |
| JP | 2011-097454 A | 5/2011 |

OTHER PUBLICATIONS

Related U.S. Appl. No. 13/448,736, filed Apr. 17, 2012 (application provided).

Office Action mailed on Feb. 1, 2013 for related U.S. Appl. No. 13/234,469.

Office Action mailed on Feb. 7, 2013 for related U.S. Appl. No. 13/448,736.

Office Action mailed on Jan. 4, 2012 for related U.S. Appl. No. 12/073,442, now U.S. Patent No. 8,325,354 issued on Dec. 4, 2012.

Office Action for related U.S. Appl. No. 13/234,469 mailed on May 15, 2014.

Office Action for related U.S. Appl. No. 13/448,736 mailed on Sep. 19, 2013.

Office Action for related U.S. Appl. No. 13/234,469 mailed on Sep. 17, 2013.

Advisory Action for related U.S. Appl. No. 13/448,736 mailed on Jan. 22, 2014.

Advisory Action for related U.S. Appl. No. 13/234,469 mailed on Dec. 11, 2013.

Examiner's Answer for related U.S. Appl. No. 13/448,736 mailed on Sep. 8, 2014.

* cited by examiner

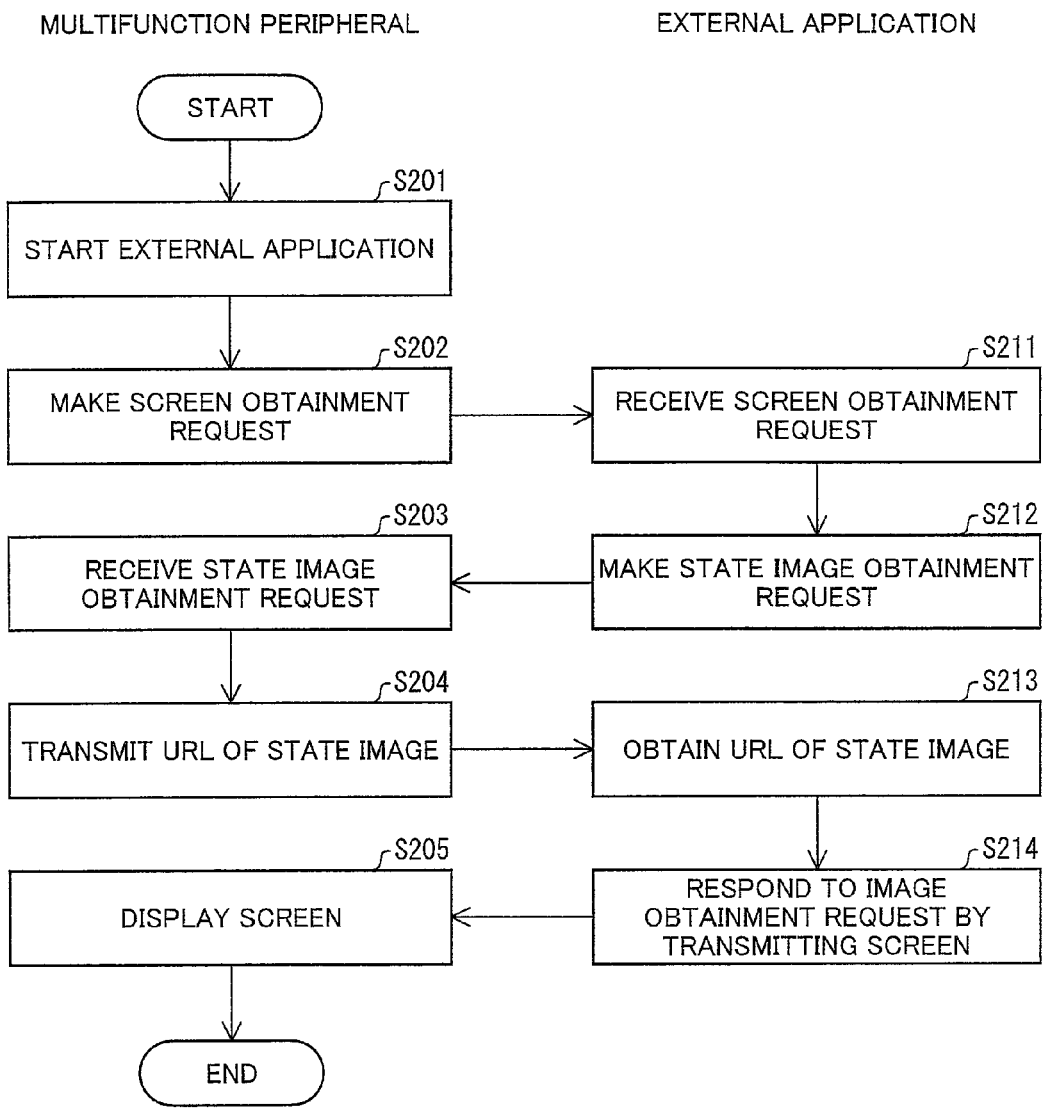

FIG. 3

| ID | APPLICATION NAME | REGISTERED ADDRESS |
|---|---|---|
| 1 | IDENTIFICATION DOCUMENT COPY | http://example.com/copy |
| 2 | FORM PRINTING | http://example.com/print |

FIG. 4

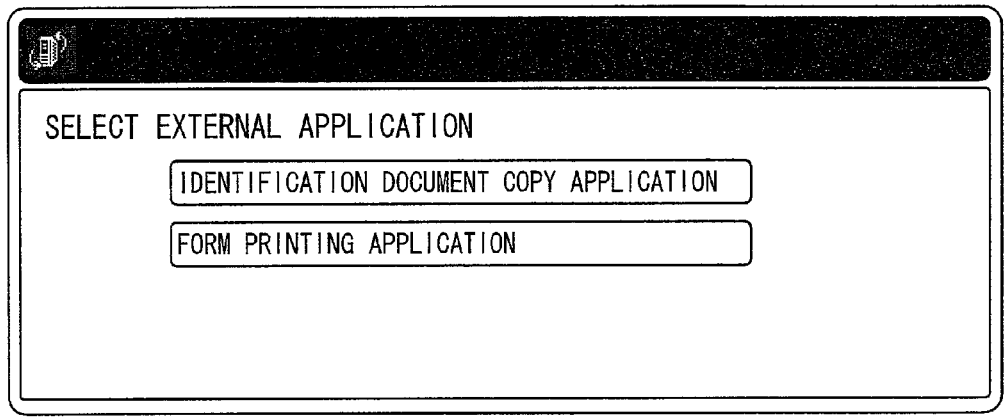

FIG. 5

```
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
 <SOAP-ENV:Body>
  <GetConfImg/>
 </SOAP-ENV:Body>
</SOAP-ENV:Envelope>
```

FIG. 6

```
<SOAP-ENV:Envelope
xmlns:SOAP-ENV="http://schemas.xmlsoap.org/soap/envelope/"
SOAP-ENV:encodingStyle="http://schemas.xmlsoap.org/soap/encoding/">
  <SOAP-ENV:Body>
    <GetConfImgResponse>
      <link>http://127.0.0.1/tmp/mfpconf.png</link>
  </GetFileListResponse>
  </SOAP-ENV:Body>
</SOAP-ENV:Envelope>
```

FIG. 7

```
<html>
 <body>
  <h2>IDENTIFICATION DOCUMENT COPY APPLICATION</h2>
  <form>
    <p>SET IDENTIFICATION DOCUMENT AND PRESS COPY BUTTON</p>
    <p>BOTH SIDES OF DOCUMENT WILL BE COPIED (CARD SUCH AS DRIVER'S LICENSE IS USABLE)</p>
    <img src=" http://127.0.0.1/tmp/mfpconf.png">
    <br/>
    <img src=" http://example.com/copy/start.png" align="right">
  </form>
 </body>
</html>
```

FIG. 10

```
01 : <html>
02 :   <head>
03 :     <script type="text/javascript">
04 :       var disp = document.getElementById('dispUI');
05 :       function DispUI(jsondata) {
06 :         disp.innerHTML = "<img src='" + jsondata.src + "'>";
07 :       }
08 :     </script>
09 :     <script   type="text/javascript"
10 :         src="http://127.0.0.1/mfp/GetConfImg?callback=DispUI">
11 :   </head>
12 :   <body>
13 :     <h2>IDENTIFICATION DOCUMENT COPY APPLICATION</h2>
14 :     <form>
15 :       <p>SET IDENTIFICATION DOCUMENT AND PRESS COPY BUTTON</p>
16 :       <p>BOTH SIDES OF DOCUMENT WILL BE COPIED (CARD SUCH AS DRIVER'S LICENSE IS USABLE)</p>
17 :       <div id="dispUI"/>
18 :       <br/>
19 :       <img src=" http://example.com/copy/start.png" align="right">
20 :     </form>
21 :   </body>
22 : </html>
```

FIG. 11

```
DispUI({"src": "http://127.0.0.1/tmp/mfpconf.png"})
```

FIG. 12

```
01 : <html>
02 :   <head>
03 :     <script type="text/javascript">
04 :       var disp = document.getElementById('dispUI');
05 :       function DispUI(jsondata) {
06 :         disp.innerHTML = "<img src='" + jsondata.src + "'>";
07 :       }
08 :       // IMAGE UPDATE PROCESS
09 :       function onMFPConfUpdate() {
10 :         var srcurl = event.url;
11 :         disp.innerHTML = "<img src='" + srcurl + "'>";
12 :       }
13 :     </script>
14 :     <script  type="text/javascript"
15 :         src="http://127.0.0.1/mfp/GetConfImg?callback=DispUI">
16 :   </head>
17 :   <body>
18 :     <h2>IDENTIFICATION DOCUMENT COPY APPLICATION</h2>
19 :     <form>
20 :       <p>SET IDENTIFICATION DOCUMENT AND PRESS COPY BUTTON</p>
21 :       <p>BOTH SIDES OF DOCUMENT WILL BE COPIED (CARD SUCH AS DRIVER'S LICENSE IS USABLE)</p>
22 :       <div id="dispUI" onMFPConfUpdate= "onMFPConfUpdate()"/>
23 :       <br/>
24 :       <img src="http://example.com/copy/start.png" align="right">
25 :     </form>
26 :   </body>
27 : </html>
```

MULTIFUNCTION PERIPHERAL

This Nonprovisional application claims priority under 35 U.S.C. §119(a) on Patent Application No. 2010-228774 filed in Japan on Oct. 8, 2010, the entire contents of which are hereby incorporated by reference.

TECHNICAL FIELD

The present invention relates to a multifunction peripheral which operates in cooperation with an application of an information processor.

BACKGROUND ART

A multifunction peripheral and an information processor have recently been connected via a communication network, so as to carry out various processes. Namely, a multifunction peripheral can operate as part of a total application system by causing an application operating in an information processor and a function of the multifunction peripheral to cooperate with each other. This facilitates easy construction of flexible service in which a function of a multifunction peripheral and a function of a PC are combined appropriately. For example, Patent Literature 1 discloses a multifunction peripheral control system including a multifunction peripheral and an information processor which transmits a control instruction to the multifunction peripheral via a communication network. Patent Literature 2 discloses a technique for calling a function of an image forming apparatus in accordance with the details of a message received from an external device.

CITATION LIST

Patent Literature 1

Japanese Patent Application Publication, Tokukai, No. 2007-174400 A (Publication Date: Jul. 5, 2007)

Patent Literature 2

Japanese Patent Application Publication, Tokukai, No. 2009-208430 A (Publication Date: Sep. 17, 2009)

SUMMARY OF INVENTION

Technical Problem

According to the technique disclosed in Patent Literature 1, the information processor prepares data on an operation screen to be displayed on an operation panel of the multifunction peripheral and then transmits the data to the multifunction peripheral. This allows the operation screen to be displayed on the operation panel of the multifunction peripheral.

The operation screen to be displayed on the operation panel of the multifunction peripheral may include an image indicative of a current state of the multifunction peripheral (hereinafter referred to as a state image). The image is exemplified by an image which schematically indicates an appearance of the multifunction peripheral and indicates what size of sheets are placed in each of a plurality of paper feeding trays provided in the multifunction peripheral.

In a case where the following process is carried out, a system in which a multifunction peripheral and an information processor operate in cooperation with each other allows the multifunction peripheral to display an operation screen including such a state image. Namely, the information processor requests, from the multifunction peripheral, state information indicative of a current state of the multifunction peripheral. Then, in accordance with the state information obtained from the multifunction peripheral, the information processor generates state image data indicative of a state image, so as to incorporate the state image data in operation screen data. Subsequently, the information processor transmits the operation screen data thus generated to the multifunction peripheral. This allows the operation screen including the state image to be displayed on an operation panel of the multifunction peripheral.

However, in a case where such a process is carried out, much time is required for, for example, notification of the state information from the multifunction peripheral to the information processor and generation of the state image data by the information processor. This causes a problem such that the operation screen flickers or a state of the multifunction peripheral cannot be displayed in real time.

In addition, an appearance of a multifunction peripheral depends on a model of the multifunction peripheral and an optional device mounted in the multifunction peripheral. Therefore, in order for an information processor to prepare a state image which schematically indicates the appearance, it is necessary to preliminarily obtain information on the model of the multifunction peripheral and the optional device. Further, models of multifunction peripherals and optional devices are diverse. This complicates a process in which an information processor generates state image data.

The present invention has been made in view of the problems, and an object of the present invention is to provide a multifunction peripheral which operates in cooperation with an application of an information processor and is capable of causing a display section of the multifunction peripheral to display, in a short time, an operation screen including a state image indicative of a state of the multifunction peripheral.

Solution to Problem

In order to attain the object, the present invention is a multifunction peripheral which communicates with an information processor via a communication network, so as to carry out a cooperative process which is in cooperation with an external application that is executed by the information processor, the information processor including a first web server section which operates in accordance with web server software, the multifunction peripheral including: a display section; a web browser section which operates in accordance with web browser software and causes a screen to be displayed in the display section in accordance with data received from the first web server section; a state image storage section which stores state image data for causing the display section to display an image indicative of a state of the multifunction peripheral; and a control section which generates location information indicative of a location of the state image data stored in the state image storage section, the web browser section carrying out an operation screen display process in which the web browser section obtains the state image data indicated by the location information from the state image storage section in accordance with operation screen data including the location information generated by the control section, so as to cause an operation screen including a state image represented by the state image data to be displayed in the display section.

Advantageous Effects of Invention

According to the present invention, a multifunction peripheral, which operates in cooperation with an application of an information processor, is capable of causing a display section of the multifunction peripheral to display, in a short time, an operation screen including a state image indicative of a state of the multifunction peripheral.

BRIEF DESCRIPTION OF DRAWINGS

FIG. 1 illustrates an arrangement of a multifunction peripheral control system in accordance with an embodiment of the present invention.

FIG. 2

FIG. 2 is a flowchart illustrating how a process for displaying a state image is carried out in First Embodiment.

FIG. 3

FIG. 3 illustrates an example of an application information management table.

FIG. 4

FIG. 4 illustrates an example of an application selection screen.

FIG. 5

FIG. 5 illustrates a GetConfImg command sample using SOAP.

FIG. 6

FIG. 6 illustrates a GetConfImg response sample using SOAP.

FIG. 7

FIG. 7 illustrates an example of HTML data on an operation screen which data includes location information.

FIG. 8 illustrates a screen which is displayed in accordance with the HTML data illustrated in FIG. 7.

FIG. 9 illustrates how a process for displaying a state image is carried out in Second Embodiment.

FIG. 10

FIG. 10 illustrates an example of HTML data which is transmitted from an information processor to a multifunction peripheral in the Second Embodiment.

FIG. 11

FIG. 11 illustrates an example of data for a response to GetConfImg from a control application section to a web browser section.

FIG. 12

FIG. 12 illustrates an example of HTML data which is transmitted from an information processor to a multifunction peripheral in a modification.

DESCRIPTION OF EMBODIMENTS

[First Embodiment]

An embodiment of the present invention is described below with reference to FIGS. 1 through 8. The following description discusses an embodiment of a multifunction peripheral control system in accordance with the present invention.

Figure 1:
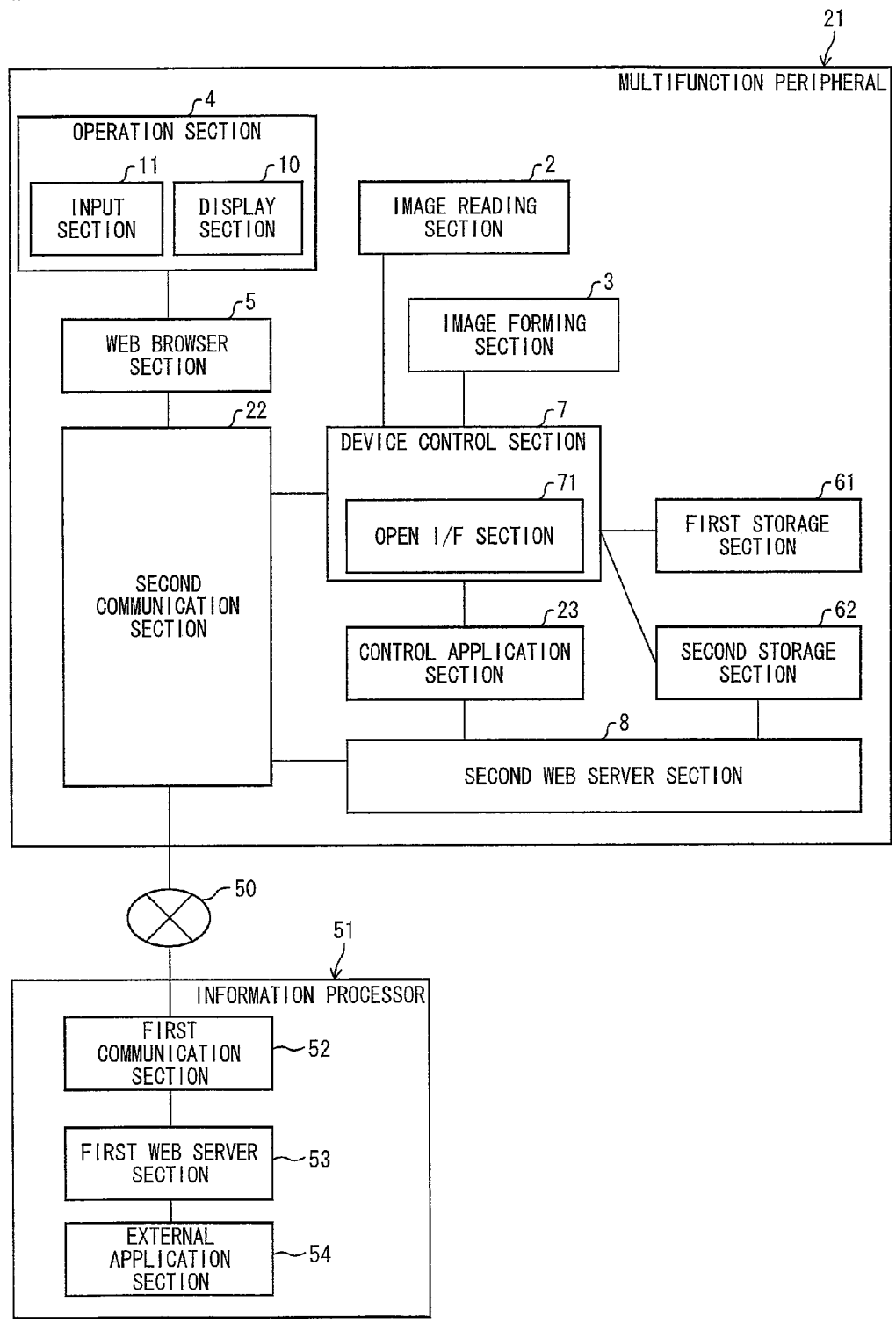
FIG. 1

FIG. 1 illustrates an arrangement of a multifunction peripheral control system in accordance with the present embodiment. The multifunction peripheral control system in accordance with the present embodiment includes a multifunction peripheral 21 and an information processor 51, which are connected via a communication network 50. Not to mention, the multifunction peripheral control system may include a plurality of multifunction peripherals. Alternatively, the multifunction peripheral control system may include a plurality of information processors.

Note that the communication network 50 via which the multifunction peripheral 21 and the information processor 51 are connected is exemplified by the Internet, a telephone line, a serial cable, and other communication lines such as a wire circuit and a wireless circuit.

The multifunction peripheral 21 receives control commands from the information processor 51. Then, the multifunction peripheral 21 carries out functions thereof (e.g., a scanning function, a printing function, and a communication function) in accordance with the control commands received.

For example, the multifunction peripheral 21 receives HTML (Hypertext Markup Language) data indicative of an operation screen from the information processor 51, so as to cause the operation screen in accordance with the HTML data to be displayed. Then, the multifunction peripheral 21 transmits, to the information processor 51, the details of an instruction inputted to the operation screen and then carries out the functions thereof in accordance with the control commands received from the information processor 51.

Alternatively, the multifunction peripheral 21 may carry out the functions thereof by carrying out a command described in a Java (Registered Trademark) script of the control commands received from the information processor 51.

The information processor 51 is a computer device which is constituted mainly by arithmetic processing sections such as a CPU and a dedicated processor and storage sections such as a RAM, a ROM, and a HDD. The information processor 51 serves as a web server device for the multifunction peripheral 21 including the plurality of multifunction peripherals. The information processor 51 includes a first communication section 52, a first web server section 53, and an external application section 54 (see FIG. 1).

The first communication section 52 communicates with the multifunction peripheral 21 via a LAN, an Internet circuit, or the like. Further, the first communication section 52 communicates with the multifunction peripheral 21 by use of an HTTP communication protocol.

The first web server section 53 operates in accordance with web server software. Note here that a web server is software which provides a function of a server device constituting WWW (World Wide Web) that is an information system on the Internet. The first web server section 53 has a function of receiving a request (here an HTTP request) from the multifunction peripheral 21 via the first communication section 52, so as to respond to the multifunction peripheral 21 via the first communication section 52 with a file, image data, printing data, a control command, and/or the like in accordance with the HTTP request.

The external application section 54 is a block which operates in accordance with a given web application in response to an instruction from the first web server section 53. Namely, the external application section 54 operates in accordance with web applications operating on the web server (hereinafter referred to as external applications).

For example, in a case where the external application section 54 receives, from the multifunction peripheral 21, a request (an HTTP (hypertext transfer protocol) request) for transmission of the operation screen, the external application section 54 operates in accordance with an operation screen transmission program of a selected external application. Specifically, the external application section 54 generates HTML data on the operation screen which data is indicated by the request, so as to transmit the HTML data to the first web server section 53.

Alternatively, in a case where the external application section 54 receives, from the multifunction peripheral 21, a request for transmission of printing data, the external application section 54 operates in accordance with a printing application. Specifically, the external application section 54 obtains printing data whose file name is specified by a folder whose name is indicated by the request, so as to transmit the printing data to the first web server section 53.

The following description discusses an arrangement of the multifunction peripheral 21. The multifunction peripheral 21 is an apparatus which is capable of carrying out a plurality of functions such as the scanning function, the printing function, a facsimile transmission and reception function, and an image data transmission function.

The multifunction peripheral 21 includes an operation section 4, an image reading section 2, an image forming section 3, a web browser section 5, a second communication section 22, a device control section (control section) 7, a second web server section 8, a control application section 23, a first storage section, and a second storage section 62 (see FIG. 1).

The operation section 4 is a user interface which notifies a user of information and receives an input from the user. The operation section 4 includes a display section 10 such as a liquid crystal display and an input section 11 including input keys. Note that the operation section 4 may be a touch panel in which the display section 10 and the input section 11 are integrated.

The image reading section 2 includes a scanner and a document carrying section which carries a document to the scanner. The image reading section 2 reads, as image data, a text and/or an image printed on the document. Note that the image reading section 2 reads an image at a predetermined resolution.

The image forming section 3 prints, onto a recording sheet such as paper, an image (a text/a photograph/a graphic) which corresponds to inputted image data. The image forming section 3 mainly includes a photoreceptor drum, a charging device, an exposure device, a developing device, a transfer device, a fixing device, a paper feeding tray, and a sheet carrying path.

The image forming section 3, which has a plurality of paper feeding trays, includes a size sensor and a remaining amount sensor. The size sensor detects a size of sheets stacked in each of the plurality of paper feeding trays. The remaining amount sensor detects a remaining amount of sheets stacked in each of the plurality of paper feeding trays. The image forming section 3 generates tray-sheet correspondence information in accordance with outputs from the respective sensors, so as to supply the tray-sheet correspondence information thus generated to the device control section 7. In the tray-sheet correspondence information, tray discrimination information and sheet information correspond to each other. The tray discrimination information discriminates the plurality of paper feeding trays, and the sheet information indicates a size and a remaining amount of sheets stacked in one of the plurality of paper feeding trays which is indicated by a corresponding piece of the tray discrimination information. Note that each of the size sensor, the remaining amount sensor, and the image forming section 3 may use a publicly-known method to generate the tray-sheet correspondence information.

The second communication section 22 is an interface for communicating with an external device such as the information processor 51. According to the present embodiment, the second communication section 22 communicates with the information processor 51 (described earlier). In a case where an IP address of the multifunction peripheral 21 is shown as a destination which the second communication section 22 access, the second communication section 22 can also access the second web server section 8 provided in the multifunction peripheral 21.

The web browser section 5 operates in accordance with general-purpose web browser software. The web browser section 5 can communicate, via the second communication section 22, not only with the first web server section 53 provided in the information processor 51 but also with the second web server section 8 provided in the multifunction peripheral 21.

The second web server section 8 operates in accordance with general-purpose web server software. In response to a request (an HTTP request) received from the web browser section 5, the second web server section 8 causes an application in accordance with the request to be carried out, so as to give a response (an HTTP response) to the web browser section 5.

The control application section 23 carries out a process in accordance with a web application operating on a web server. The web application is exemplified by a custom application which is described in a Java (Registered Trademark) script and operates in a Java (Registered Trademark) script execution environment provided on a web server.

In a case where the functions (e.g., the scanning function, the printing function, and the communication function) of the multifunction peripheral 21 need to be controlled, the control application section 23 transmits, to the device control section 7, an instruction to control the functions.

The first storage section 61 stores information (appearance image information) on an image which schematically indicates an appearance of the multifunction peripheral, the information being displayed on the operation screen. Note that the first storage section 61 is set to be inaccessible from the second web server section 8.

According to the present embodiment, the first storage section (parts image storage section) 61 preliminarily stores, as appearance image information, parts image data which schematically indicate appearances of the respective sections (such as the image forming section, the image reading section, the paper feeding tray, a paper output tray, and the sheet carrying path) and an optional device which can be mounted in the multifunction peripheral. The parts image data indicate a respective plurality of kinds of partial images for constituting a state image described later.

The first storage section 61 stores, as parts image data on the respective sections, not only information indicative of appearances of the respective sections but also a plurality of kinds of parts image data indicative of states of the respective sections. For example, the first storage section 61 stores, as parts image data indicative of a state of each of the plurality of paper feeding trays, parts image data indicative of a size of sheets and parts image data indicative of a remaining amount of sheets.

Note that the first storage section 61 stores parts image data in which each of information (parts specifying information) specifying a section and an optional device that are represented by the parts image data and information (state information) indicative of a state corresponds to the parts image data.

The second storage section (state image storage section) 62 stores data (state image data) on a state image indicative of a state of the multifunction peripheral 21. Note that the state image is exemplified by an image which schematically indicates an appearance of the multifunction peripheral and indicates a size and a remaining amount of sheets stacked in each of the plurality of paper feeding trays. Note also that the image which schematically indicates an appearance of the multifunction peripheral may include an image of an optional device mounted in the multifunction peripheral. The second storage section 62 is accessible from the second web server section 8.

The device control section 7 controls the functions of the multifunction peripheral 21. Specifically, the device control section 7 controls operations mainly of the image reading section 2, the image forming section 3, the second communication section 22, and the operation section 4. Further, the device control section 7 can obtain, from an optional device mounted in the multifunction peripheral, optional device information which identifies the optional device, so as to control the optional device.

The device control section 7 has a unique operation mode and a cooperative operation mode. In the unique operation mode, which is unique to the multifunction peripheral 21, the multifunction peripheral 21 causes the display section 10 to display the operation screen preliminarily stored in the multifunction peripheral 21 and receives, from the input section 11, an instruction inputted to the operation screen, so as to carry out control as described above in accordance with the instruction. In the cooperative operation mode, the multifunction peripheral 21 causes the display section 10 to display the operation screen received from the information processor and receives a control command generated by an external application in accordance with an instruction inputted to the operation screen, so as to control the functions in accordance with the control command thus received. Namely, in the cooperative operation mode, the external application and the multifunction peripheral 21 cooperate with each other to carry out a cooperative process.

In a case where the unique operation mode is selected, the device control section 7 obtains (i) the tray-sheet correspondence information from the image forming section 3 and (ii) the optional device information from the optional device. Then, the device control section 7 reads out, from the first storage section 61, parts image data which corresponds to these pieces of information thus obtained and parts image data which corresponds to an appearance of a basic arrangement of a main part of the multifunction peripheral and then combines these sets of parts image data thus read out, so as to generate state image data indicative of a current state of the multifunction peripheral. In accordance with a user's operation, the device control section 7 carries out control to cause the operation screen including a state image represented by the state image data thus generated to be displayed in the display section 10. Note that, since the unique operation mode is commonly used in a conventional multifunction peripheral, a specific description of a process carried out in the unique operation mode is omitted.

In contrast, in a case where the device control section receives an input of an instruction to select the cooperative operation mode, the device control section 7 causes the web browser section 5 to start and carry out a process in accordance with a URL (in the present embodiment, a URL which requests the first web server section 53 of the information processor 51 to transmit an initial operation screen) which is preliminarily set. Access of the multifunction peripheral 21 to the external application section 54 starts the cooperative operation mode. In response to a notification from the external application section 54 that the external application section 54 has finished its process, the multifunction peripheral 21 finishes accessing the external application section, so that the cooperative operation mode is ended.

Note that the device control section 7 includes an Open I/F section 71 which can receive a control command that is independent of a model of the multifunction peripheral 21. The Open I/F section 71, which opens, to the control application section 23, a control command to control the functions of the multifunction peripheral 21, receives the control command from the control application section 23 and converts the control command thus received to a command which is recognizable to the device control section 7.

The Open I/F section 71 includes a conversion table storage section (not illustrated) which stores a conversion table in which a control command that is opened to an outside of the device control section 7 and a command that is recognizable to the device control section 7 correspond to each other. The Open I/F section 71 carries out a command conversion process in accordance with the conversion table.

As described earlier, the Open I/F section 71 can receive a shared control command that is independent of a model of the multifunction peripheral 21. According to this, a web application for causing the control application section 23 to operate can be shared irrespective of the multifunction peripheral 21. Therefore, in order to cause the control application section 23 to operate in accordance with a new web application, it is only necessary to install an identical application on each of the plurality of multifunction peripherals and it is unnecessary to change a web application for the each of the plurality of multifunction peripherals. This allows easy development of a web application for causing the control application section 23 to operate.

(Process for Displaying State Image in Cooperative Operation Mode)

The following description specifically discusses a process which is characteristic of the present embodiment and in which a state image indicative of a current state of the multifunction peripheral is displayed on the operation screen in the cooperative operation mode.

FIG. 2 is a flowchart illustrating a process for displaying a state image. First, in response to an input to the input section 11 of an instruction to start the cooperative operation mode, the device control section 7 reads out an application information management table which is preliminarily stored therein. In the application information management table, for each of a plurality of external applications which the information processor 51 has, pieces of application discrimination information (e.g., an application name) which discriminate the plurality of external applications and URLs (uniform resource locators) for accessing the respective plurality of external applications correspond to each other. FIG. 3 illustrates an example of the application information management table.

Then, the device control section 7 causes the display section 10 to display an application selection screen which includes a list of the pieces of application discrimination information, the list being stored in the application information management table thus read out and promotes a user to select an external application. FIG. 4 illustrates an example of the application selection screen.

In response to a selection of one external application on the application selection screen, the device control section 7 obtains, from the application information management table, a URL which corresponds to a selected piece of application identification information. Then, the device control section 7 causes the web browser section 5 to start and access the URL thus obtained (S201). This causes the web browser section 5 to transmit, via the second communication section 22 to the one external application of the information processor 51 which application is indicated by the URL, an HTTP Get command which requests transmission of the initial operation screen (S202).

Note here that an identification document copy application has been selected. The identification document copy application is used to carry out a process for copying an identification document such as a driver's license.

The first web server section 53 which is provided in the information processor 51 and has received the HTTP GET command (S211) requests, from the external application section 54, HTML data on the operation screen which data corresponds to the HTTP GET command.

The external application section 54 generates HTML data in accordance with the request. Note here that the external application section 54 generates HTML data indicative of the operation screen which corresponds to the identification document copy application. In order to make an identification document copy, the user needs to check a size and a remaining amount of sheets to be copied. Therefore, HTML data is generated which corresponds to the operation screen including a state image indicative of a current state of the multifunction peripheral.

In order to generate the HTML data described above, the external application section 54 first transmits, to the multifunction peripheral 21, a request (a state image obtainment request) for obtainment of a state image indicative of a current state of the multifunction peripheral 21 (S212).

The state image obtainment request can be made by use of HTTP GET, POST, SOAP (Simple Object Access Protocol), or the like. An example using SOAP is described here. FIG. 5 illustrates a sample of a GetConfImg command for the state image obtainment request, the sample using SOAP.

The second communication section 22 which is provided in the multifunction peripheral 21 and has received the state image obtainment request transmits the state image obtainment request to the control application section 23 via the second web server section 8 (S203). Then, the control application section 23 which has been started by the second web server section 8 analyzes the GetConfImg command for the state image obtainment request, so as to transmit, to the device control section 7, a control command for the state image obtainment request which command has been generated in accordance with a result of the analysis.

The device control section 7, which receives, from the control application section 23, the control command for the state image obtainment request, carries out the following process.

First, the device control section 7 obtains (i) the tray-sheet correspondence information from the image forming section 3 and (ii) the optional device information from the optional device. Then, the device control section 7 reads out, from the first storage section 61, the parts image data which corresponds to the appearance of the basic arrangement of the main part of the multifunction peripheral, parts image data which corresponds to the parts specifying information that matches the optional device information thus obtained, and parts image data which corresponds to the state information that matches the tray-sheet correspondence information thus obtained. Then, the device control section 7 combines these sets of parts image data thus read out, so as to generate state image data indicative of a current state of the multifunction peripheral. Thereafter, the device control section 7 stores the state image data thus generated in the second storage section 62.

Subsequently, the device control section 7 generates, as location information, a URL indicative of a location of the state image data stored in the second storage section 62, so as to respond to the control application section 23. Note that an IP address unique to a multifunction peripheral or a loopback address (e.g., 127.0.0.1) may be used as an IP address included in the URL indicative of the location of the state image data. Note also that a localhost may be used as another means to indicate a loopback address of the multifunction peripheral itself. The present embodiment is arranged to use the loopback address (127.0.0.1).

Then, the control application section 23 transmits the location information thus generated to the information processor 51 via the second web server section 8 and the second communication section 22 (S204). FIG. 6 illustrates a GetConfImg response sample using SOAP. In FIG. 6, "http://127.0.0.1/tmp/mfpconf.png" is the location information.

Next, the external application section 54 receives the location information from the multifunction peripheral 21 via the first communication section 52 and the first web server section 53 (S213). Then, the external application section 54 generates HTML data on the operation screen which data includes, as a URL of an image, a URL that is the location information thus received. FIG. 7 illustrates an example of the HTML data. In FIG. 7, "img src" indicates a URL of an image. Then, the external application section 54 transmits the HTML data thus generated to the multifunction peripheral 21 (S214).

In the multifunction peripheral 21, the web browser section 5 receives the HTML data, so as to carry out a process in accordance with the HTML data thus received. Namely, the web browser section 5 obtains, in accordance with "img src='http://127.0.0.1/tmp/mfpconf.png'", an image to be included in the operation screen. Note here that, since a URL of an image is indicated by a loopback address as "http://127.0.0.1...", the web browser section 5 accesses the second web server section 8 which is a web server provided in the multifunction peripheral 21, so as to receive, from the second web server section 8, image data indicated by a URL. According to this, the web browser section 5 allows the display section 10 to display the operation screen including a state image 81 represented by the state image data stored in the second storage section 62 (S205) (see FIG. 8).

Thereafter, in response to a press on a copy button on the operation screen, the web browser section 5 transmits information on the pressed button to the external application section 54. Then, the external application section 54 generates a control command to carry out copying and transmits the control command to the multifunction peripheral 21. The control command can be transmitted by, for example, a method for causing Java (Registered Trademark) Script to call the control application section 23 or a method such as SOAP. This causes the control application section 23 to notify the device control section 7 of the control command. In accordance with the control command received, the device control section 7 controls each of the sections to start copying.

When the operation screen of the multifunction peripheral 21 is changed to an initial screen (see FIG. 4) after an end of the cooperative process carried out by the external application section 54 and the multifunction peripheral 21, the device control section 7 deletes the state image data stored in the second storage section 62. This prevents unnecessary data from remaining in the second storage section 62 and consequently prevents compression of a storage area for the multifunction peripheral 21. Note that, in a case where the multifunction peripheral 21 receives a notification from the external application section 54 that the external application section 54 has finished its process, the device control section 7 can determine that the cooperative process has been ended.

As described earlier, according to the present embodiment, state image data is preliminarily prepared in the multifunction peripheral 21 and then stored in the second storage section 62. The device control section 7 generates location information indicative of a location of the state image data, so as to transmit the location information to the external application section 54. According to this, the external application section 54 which includes only the location information in HTML data allows the web browser section 5 to obtain the state image data from the second storage section 62 in accordance with the HTML data, so as to display, in the display section 10, an operation screen including a state image represented by the state image data. Namely, since it is unnecessary for the multifunction peripheral 21 and the external application 54 to transmit/receive the state image data itself, the HTML data can be generated in a shorter time.

The state image data is stored in the second storage section 62 which is accessible from the second web server section 8. Therefore, a URL is usable as location information. This allows the web browser section 5 to obtain the state image data from the second web server section 8 in accordance with the URL.

Further, for the URL indicative of the location information on the state image data, not an IP address unique to the multifunction peripheral 21 but a loopback address is used as an IP address. Therefore, even in a case where another device fraudulently obtains the HTML data transmitted at S214, the another device cannot obtain the state image data on the multifunction peripheral 21 in accordance with the location information in the HTML data. Namely, only the web browser section 5 of the multifunction peripheral 21 can normally obtain the state image data in accordance with the HTML data and display the state image data thus obtained, so that an unauthorized access from the another device to the state image data can be prevented.

<Second Embodiment>

The First Embodiment is discussed assuming that the external application section 54 prepares operation screen data including location information on state image data and the operation screen data is transmitted from the first web server section 53 of the information processor 51 to the multifunction peripheral 21. However, the external application section 54 may transmit, to the web browser section 5, data including an instruction to carry out a process in which location information on state image data is incorporated in operation screen data, so as to cause the multifunction peripheral 21 to prepare operation screen data including location information on state image data. The following description discusses an embodiment in which the multifunction peripheral 21 prepares operation screen data including location information on state image data.

Figure 9:
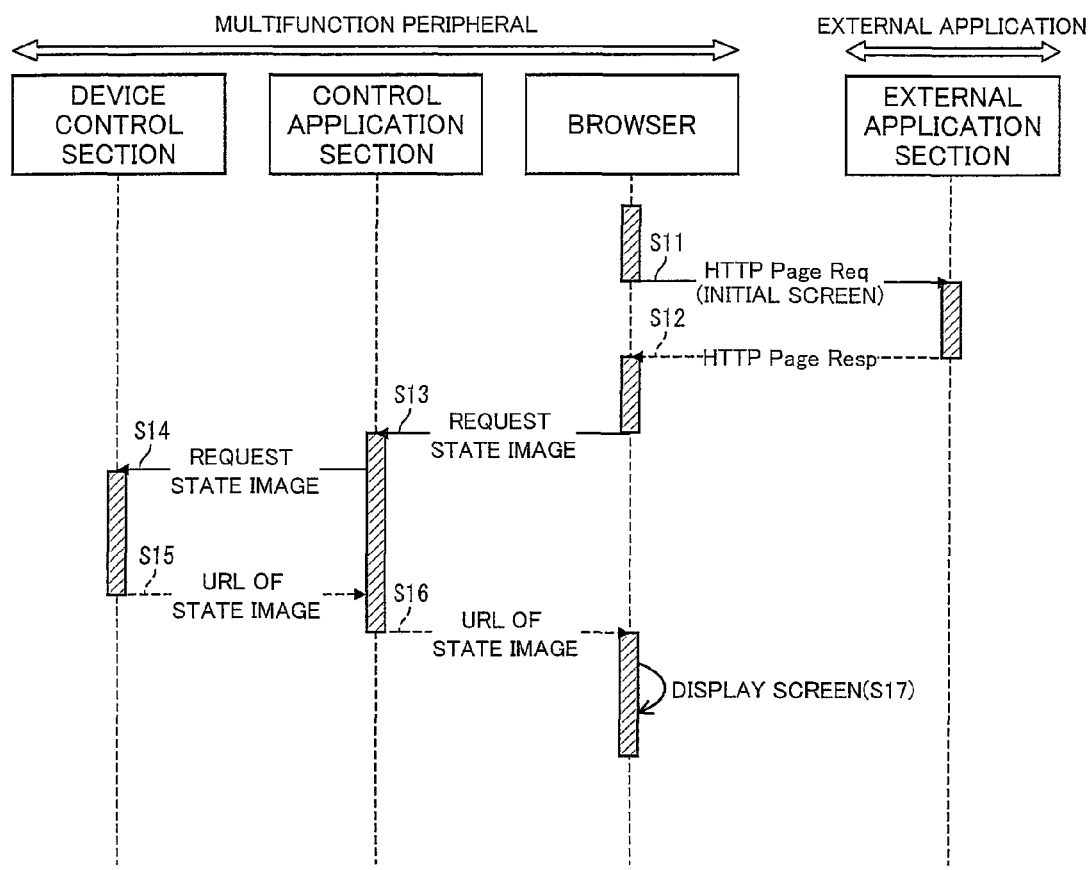
FIG. 9

FIG. 9 illustrates how a process is carried out in the present embodiment for displaying an operation screen including a state image represented by state image data. Note that sections of a multifunction peripheral 21 and an information processor 51 of the present embodiment are identical in arrangement to the sections of the First Embodiment.

First, in a case where an input section 11 receives an instruction to start a cooperative operation mode and an external application to be executed is selected, a device control section 7 specifies a URL which corresponds to the external application selected (here assuming that an identification document copy application is selected). Then, the device control section 7 causes a web browser section 5 to start and access the URL specified. This causes the web browser section 5 to transmit, via a second communication section 22 to the external application of the information processor 51 which application is indicated by the URL, an HTTP Get command which requests transmission of an initial operation screen for the identification document copy application (S11).

In response to the HTTP Get command of S11, each of an external application section 54 and a first web server section 53 replies, to the multifunction peripheral 21, with HTML data which corresponds to (i) the HTTP Get Command and (ii) the initial operation screen for the identification document copy application (S12). FIG. 10 illustrates an example of the HTML data with which the reply is made at S12. Note that the HTML data does not include numbers "01" to "22" on the left of FIG. 10, which are described for convenience of explanation.

The web browser section 5 which has received the HTML data as illustrated in FIG. 10 analyzes the HTML data. A link exists in lines 9 and 10 of FIG. 10 to call a control application section 23 via a second web server section 8 by use of a loopback address. Therefore, the web browser section 5 carries out a process described in line 9 of FIG. 10 in advance of displaying the operation screen.

A <script> tag is described in line 9 of FIG. 10. The <script> tag, which is commonly used to obtain a Java (Registered Trademark) Script file, may be used as a method for calling service of the control application section 23 by use of the fact that an HTTP Get request is used to make a request for obtainment of data. Namely, a loopback address is described in the <script> tag. This causes the web browser section 5 to access the second web server section 8 provided in the multifunction peripheral 21. Then, the web browser section 5 causes the control application section 23 operating in the second web server section 8 to carry out a process for requesting GetConfImg (a state image) indicated by a URL in the <script> tag (S13). Such an approach, which is referred to as JSONP (Java (Registered Trademark) Script Object Notation with Padding), is a publicly known technique.

The control application section 23 calls the device control section 7 and transmits a command for a state image obtainment request to the device control section 7 (S14). In response to the command for the state image obtainment request, the device control section 7 carries out a process as in the case of the device control section 7 of the First Embodiment.

Namely, the device control section 7 obtains (i) tray-sheet correspondence information from an image forming section 3 and (ii) optional device information from an optional device. Then, the device control section 7 reads out, from a first storage section 61, parts image data which corresponds to these pieces of information thus obtained and parts image data which corresponds to an appearance of a basic arrangement of a main part of the multifunction peripheral, so as to generate state image data. Thereafter, the device control section 7 stores the state image data thus generated in a second storage section 62 and replies to the control application section 23 with a URL indicative of a location of the state image data as location information (S15). Note here that a loopback address (e.g., 127.0.0.1) is used as an IP address included in the URL indicative of the location of the state image data.

The control application section 23, which has obtained the location information, replies to the web browser section 5 via the second web server section 8 with the location information as Java (Registered Trademark) Script which calls a function referred to as DispUI described in line 4 of FIG. 10 (S16). Note that the location information is stored in jsondata which is an argument of a DispUI Java (Registered Trademark) Script function. Such a method is also a technique which is publicly known as JSONP.

Figure 8:
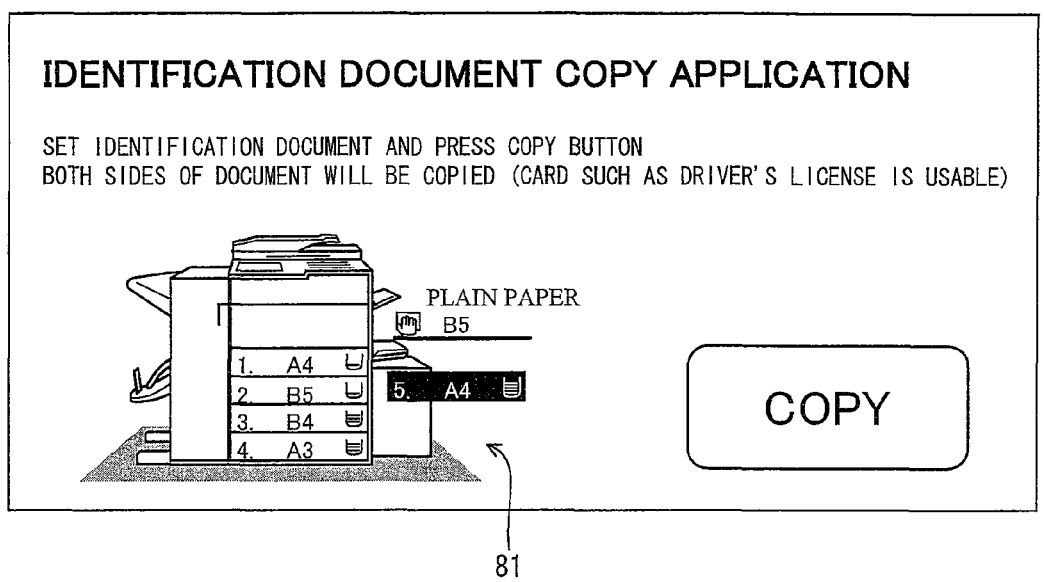
FIG. 8

In a case where the web browser section 5 carries out the function referred to as DispUI described in FIG. 10, the location information is inserted in line 15 of FIG. 10, so that the web browser section 5 can generate operation screen data which is similar to that illustrated in FIG. 7. This causes the web browser section 5 to display the operation screen as illustrated in FIG. 8 in a display section 10 (S17).

Thereafter, when the operation screen of the multifunction peripheral 21 is changed to an initial screen (see FIG. 4) after an end of a cooperative process carried out by the external application section 54 and the multifunction peripheral 21, the device control section 7 deletes the state image data stored in the second storage section 62.

As described earlier, also according to the present embodiment, state image data is preliminarily prepared in the multifunction peripheral 21 and then stored in the second storage section 62. Then, the first web server section 53 transmits, to the web browser section 5 of the multifunction peripheral 21, an instruction to cause the control application section 23 to carry out a process in which location information indicative of a location of state image data is incorporated in operation screen data. According to this, in accordance with the instruction, the web browser section 5 obtains the location information on the state image data generated by the device control section 7, so as to generate operation screen data including the location information thus obtained. Therefore, the web browser section 5 can obtain the state image data from the second storage section 62 in accordance with the operation screen data, so as to display, in the display section 10, an operation screen including a state image represented by the state image data. Namely, since it is unnecessary for the multifunction peripheral 21 and the external application section 54 to transmit/receive the state image data itself, the HTML data can be generated in a shorter time.

<Modification>

The First and Second Embodiments are discussed assuming that in response to a command for a state image obtainment request, the device control section 7 generates state image data, so as to cause an operation screen to be displayed in accordance with operation screen data including location information on the state image data. However, it can be assumed that a state of the multifunction peripheral 21 changes to be different between when the operation screen is displayed and when the device control section 7 receives the command for the state image obtainment request. Therefore, an embodiment may be arranged such that a state image is updated in a case where the multifunction peripheral 21 changes in state. The following description discusses such an embodiment.

The image forming section 3 which detects that the multifunction peripheral 21 changes in state generates new tray-sheet correspondence information, so as to transmit the new tray-sheet correspondence information to the device control section 7. An optional device which is mounted in the multifunction peripheral 21 transmits optional device information to the device control section 7. The device control section 7 which has received the new tray-sheet correspondence information from the image forming section 3 or the optional device information from the optional device generates new state image data (updated state image data) in accordance with the information received and stores the new state image data in the second storage section 62. Then, the device control section 7 notifies the web browser section 5 of (i) occurrence of a change in state image as an event of Java (Registered Trademark) script and (ii) a URL which is location information (updated location information) on the new state image data.

Meanwhile, a code (on MFPConfUpdate) for carrying out a process for updating the state image data is attached, by Javascript, to operation screen data transmitted from the information processor 51 to the multifunction peripheral 21 at S214 or S12.

Therefore, in response to the notification of occurrence of a change in state image, the web browser section 5 causes occurrence of an on MFPConfUpdate event of JavaScript, so as to obtain, from the device control section 7, the URL which is the location information (updated location information) on the new state image data (updated state image data). Then, the web browser section 5 obtains the updated state image data from the second storage section 62 in accordance with the URL, so as to update a screen of the display section 10 to an operation screen including a newest state image represented by the updated state image data.

For example, assume that the present modification is applied to the Second Embodiment. At S12 of FIG. 9, the first web server section 53 replies to the multifunction 21 with data illustrated in FIG. 12 instead of the data illustrated in FIG. 10 as the HTML data which corresponds to the initial operation screen for the identification document copy application. FIG. 12 illustrates an example of the HTML data with which the information processor 51 replies to the multifunction peripheral 21 in the present modification.

A process is described in line 22 of FIG. 12 for calling an on MFPConfUpdate function in a case where the on MFPConfUpdate event occurs. The substance of the on MFPConfUpdate function is described in lines 9 through 12 of FIG. 12 and a process in this function is carried out. Namely, a new URL is obtained from an event in line 10 of FIG. 12 and a process is described in line 11 of FIG. 12 for restructuring a link to the state image data in accordance with the new URL.

According to this, it is possible to immediately change the state image in the operation screen without the need of notifying the information processor 51 of a change in state of the multifunction peripheral 21. This requires no time for notification from the multifunction peripheral 21 to the external application section 54 and no time for the external application section 54 to restructure the state image. Therefore, there occurs no problem such that the operation screen flickers or is not reflected in real time.

Namely, even in a case where the multifunction peripheral 21 changes in state, the display section 10 can display, in real time, the operation screen including an updated state image. Further, it is unnecessary for the multifunction peripheral 21 and the information processor 51 to transmit/receive information on the change in state. This can prevent a flicker in the operation screen or longer time for update of the operation screen due to communication time between the multifunction peripheral 21 and the information processor 51.

As described earlier, the present invention is a multifunction peripheral which communicates with an information processor via a communication network, so as to carry out a cooperative process which is in cooperation with an external application that is executed by the information processor, the information processor including a first web server section which operates in accordance with web server software, the multifunction peripheral including: a display section; a web browser section which operates in accordance with web browser software and causes a screen to be displayed in the display section in accordance with data received from the first web server section; a state image storage section which stores state image data for causing the display section to display an image indicative of a state of the multifunction peripheral; and a control section which generates location information indicative of a location of the state image data stored in the state image storage section, the web browser section carrying out an operation screen display process in which the web browser section obtains the state image data indicated by the location information from the state image storage section in accordance with operation screen data including the location information generated by the control section, so as to cause an operation screen including a state image represented by the state image data to be displayed in the display section.

According to the arrangement, the web browser section obtains the state image data indicated by the location information from the state image storage section in accordance with operation screen data including the location information, so as to cause an operation screen including a state image represented by the state image data to be displayed in the display section. Therefore, it is unnecessary for the web browser section to obtain the state image data from the information processor provided outside the multifunction peripheral and it is only necessary to obtain the state image data from the state image storage section provided in the multifunction peripheral. Further, it is also unnecessary to incorporate the state image data in the operation screen data. This allows lighter traffic between the first web server section and the web browser section. Therefore, the operation screen can be displayed in a shorter time.

The multifunction peripheral of the present invention may be arranged to further include: a parts image storage section which stores parts image data indicative of a respective plurality of kinds of parts images for constituting the state image, the control section reading out, from the parts image storage section, parts image data in accordance with a current state of the multifunction peripheral and combines the parts image data thus read out, so as to generate the state image data and store the state image data in the state image storage section.

According to the arrangement, the state image data can be easily generated in the multifunction peripheral in accordance with a change in state of the multifunction peripheral.

The multifunction peripheral of the present invention is preferably arranged to further include: a second web server section which operates in accordance with web server software and can access the state image storage section, the location information being a URL (uniform resource locator) for obtaining the state image data via the second web sever section.

According to the arrangement, the location information can be easily prepared by use of a general-purpose URL. Further, the web browser section can easily obtain the state image data from the state image storage section via the second web server section by use of a URL.

The multifunction peripheral of the present invention is preferably arranged such that the URL includes a loopback address as an IP address of the multifunction peripheral.

According to the arrangement, in accordance with the loopback address, the web browser section accesses the second web server section of the multifunction peripheral so as to obtain the state image data. Therefore, even in a case where the URL is set for a device which is different from the multifunction peripheral and includes a web browser, the state image storage section of the multifunction peripheral is inaccessible from the web browser. This prevents the state image data stored in the state image storage section from being viewed from an unintended device and consequently enhances security.

The multifunction peripheral of the present invention may be arranged such that: in response to a state image data obtainment request received from the external application, the control section generates the location information and transmits the location information to the information processor; and the web browser section receives, from the information processor, the operation screen data which has been generated by the information processor in accordance with the location information received by the information processor from the control section and includes the location information, so as to carry out the operation screen display process in accordance with the operation screen data thus received.

According to the arrangement, the control section transmits the location information to the information processor and the web browser section receives the operation screen data including the location information from the information processor. Note here that the location information is extremely smaller in data capacity as compared to the state image data. Therefore, the operation screen data can be obtained from the information processor with lighter traffic and in a shorter time.

The multifunction peripheral of the present invention may be arranged such that in accordance with an instruction received from the first web server section to carry out a process in which the location information on the state image data is incorporated in the operation screen data, the web browser section obtains the location information on the state image data from the control section and generates the operation screen data including the location information thus obtained, so as to carry out the operation screen display process in accordance with the operation screen data thus generated.

According to the arrangement, the web browser section generates the operation screen data including the location information in accordance with the instruction from the first web server section. According to this, since the location information does not need to be preliminarily communicated between the multifunction peripheral and the information processor, the operation screen can be displayed in a shorter time.

The multifunction peripheral of the present invention is preferably arranged such that the control section deletes the state image data from the state image storage section after the cooperative process is ended.

The arrangement prevents unnecessary data from remaining in the state image storage section and consequently prevents compression of a storage area for the multifunction peripheral.

The multifunction peripheral of the present invention is preferably arranged such that: in a case where the multifunction peripheral changes in state, the control section stores, in the state image storage section, the state image data corresponding to the changed state of the multifunction peripheral as updated state image data, generates location information indicative of a location of the updated state image data as updated location information, and notifies the web browser section that the state image has been updated; and in a case where the web browser section is notified during the operation screen display process that the state image has been updated, the web browser section obtains the updated location information from the control section and obtains the updated state image data from the state image storage section in accordance with the updated location information, so as to update the screen of the display section to the operation screen including an image represented by the updated state image data.

According to the arrangement, even in a case where the multifunction peripheral changes in state, the display section can display, in real time, the operation screen including an updated state image. Further, it is unnecessary for the multifunction peripheral and the information processor to transmit/receive information on the change in state. This can prevent a flicker in the operation screen or longer time for update of the operation screen due to communication time between the multifunction peripheral and the information processor.

The present invention is not limited to the description of the embodiments above, but may be altered by a skilled person within the scope of the claims. An embodiment based on a proper combination of technical means disclosed in different embodiments is encompassed in the technical scope of the present invention.

Finally, each block of a multifunction peripheral 21 and an information processor 51 can be implemented by a hardware logic or by software by use of a CPU as below.

Namely, each of a multifunction peripheral 21 and an information processor 51 includes (i) a CPU (central processing unit) which executes a command of a control program that implements each function of the multifunction peripheral 21 and the information processor 51, (ii) a ROM (read only memory) in which the control program is stored, (iii) a RAM (random access memory) which extracts the control program, (iv) a storage device (a recording medium) such as a memory in which the control program and various sets of data are stored, and (v) the like. The object of the present invention is attainable by supplying, to the multifunction peripheral 21 and the information processor 51, a recording medium in which program codes (an executable program, an intermediate code program, and a source program) of a control program which is software that implements the each function are computer-readably recorded and causing a computer (or a CPU or an MPU) of each of the multifunction peripheral 21 and the information processor 51 to read out and carry out the program codes recorded in the recording medium.

Examples of the recording medium include (i) tapes such as a magnetic tape and a cassette tape, (ii) disks including magnetic disks such as a floppy (Registered Trademark) disk and a hard disk, and optical disks such as a CD-ROM, an MO, an MD, a DVD, and a CD-R, (iii) cards such as an IC card (including a memory card) and an optical card, and (iv) semiconductor memories realized by a mask ROM, EPROM, EEPROM, a flash ROM, and the like.

Each of the multifunction peripheral 21 and the information processor 51 can be connected to a communication network, via which the program codes can be supplied to the multifunction peripheral 21 and the information processor 51. Such a communication network is not particularly limited. Examples of the communication network includes the Internet, an intranet, an extranet, a LAN, ISDN, VAN, a CATV communications network, a virtual private network, a telephone network, a mobile telecommunications network, and a satellite communication network. A transmission medium of which a communication network is composed is not particularly limited. Examples of the transmission medium includes wired transmission media such as IEEE1394, a USB, a power-line carrier, a cable TV circuit, a telephone line, and ADSL and wireless transmission media such as infrared communication systems such as IrDA and a remote controller, Bluetooth (Registered Trademark), 802.11 wireless communication system, HDR, a mobile phone network, a satellite circuit, and a digital terrestrial network. Note that the present invention can also be realized in a form of a computer data signal in which the program codes are embodied by an electronic transmission and which is embedded in carrier waves.

Industrial Applicability

The present invention is applicable to a multifunction peripheral which implements a plurality of functions such as copying, scanning, and fax.

REFERENCE SIGNS LIST

2 Image reading section
3 Image forming section
4 Operation section
5 Web browser section
7 Device control section (Control section)
8 Second web server section
10 Display section
11 Input section
21 Multifunction peripheral
22 Second communication section
23 Control application section
50 Communication network
51 Information processor
52 First communication section
53 First web server section
54 External application section
61 First storage section (Parts image storage section)
62 Second storage section (State image storage section)

The invention claimed is:

1. A multifunction peripheral which is programmed to communicate with an information processor via a communication network, so as to carry out a cooperative process which is in cooperation with an external application that is executed by the information processor, the information processor including a first web server section which is programmed to operate in accordance with web server software, said multifunction peripheral comprising:

a display section;

a web browser section which is programmed to operate in accordance with web browser software and cause a screen to be displayed in the display section in accordance with data received from the first web server section;

a state image storage section which is arranged to store state image data for causing the display section to display an image indicative of a state of the multifunction peripheral; and a control section which is programmed to generate location information indicative of a location of the state image data stored in the state image storage section, the control section being programmed such that in response to a state image data obtainment request received from the external application, the control section generates the location information and transmits the location information to the information processor, and the web browser section being programmed (i) to receive, from the information processor, operation screen data which has been generated by the information processor in accordance with the location information received by the information processor from the control section and includes the location information, and (ii) to carry out an operation screen display process in which the web browser section obtains the state image data indicated by the location information from the state image storage section in accordance with the operation screen data thus received, so as to cause an operation screen including a state image represented by the state image data to be displayed in the display section.

2. The multifunction peripheral as set forth in claim 1, further comprising:

a parts image storage section which stores parts image data indicative of a respective plurality of kinds of parts images for constituting the state image, the control section reading out, from the parts image storage section, parts image data in accordance with a current state of the multifunction peripheral and combines the parts image data thus read out, so as to generate the state image data and store the state image data in the state image storage section.

3. The multifunction peripheral as set forth in claim 1, further comprising:

a second web server section which operates in accordance with web server software and can access the state image storage section, the location information being a URL (uniform resource locator) for obtaining the state image data via the second web server section.

4. The multifunction peripheral as set forth in claim 3, wherein the URL includes a loopback address as an IP address of the multifunction peripheral.

5. The multifunction peripheral as set forth in claim 1, wherein the control section deletes the state image data from the state image storage section after the cooperative process is ended.

6. The multifunction peripheral as set forth in claim 1, wherein:

in a case where the multifunction peripheral changes in state, the control section stores, in the state image storage section, the state image data corresponding to the changed state of the multifunction peripheral as updated state image data, generates location information indicative of a location of the updated state image data as updated location information, and notifies the web browser section that the state image has been updated; and in a case where the web browser section is notified during the operation screen display process that the state image has been updated, the web browser section obtains the updated location information from the control section and obtains the updated state image data from the state image storage section in accordance with the updated location information, so as to update the screen of the display section to the operation screen including an image represented by the updated state image data.

7. The multifunction peripheral as set forth in claim 1, wherein the image indicative of a state of the multifunction peripheral is at least one of an image indicating an appearance of the multifunction peripheral, an image indicating a sheet size, and an image indicating a remaining amount of sheets.

\* \* \* \* \*